Jan. 23, 1962 — V. S. FOOTE, JR — 3,017,766
NOSE PROBE CHUCK

Filed Jan. 26, 1959 — 2 Sheets-Sheet 1

INVENTOR
Vernon S. Foote, Jr.

BY Q. Baxter Warner,
Claude Funkhouser
ATTORNEYS

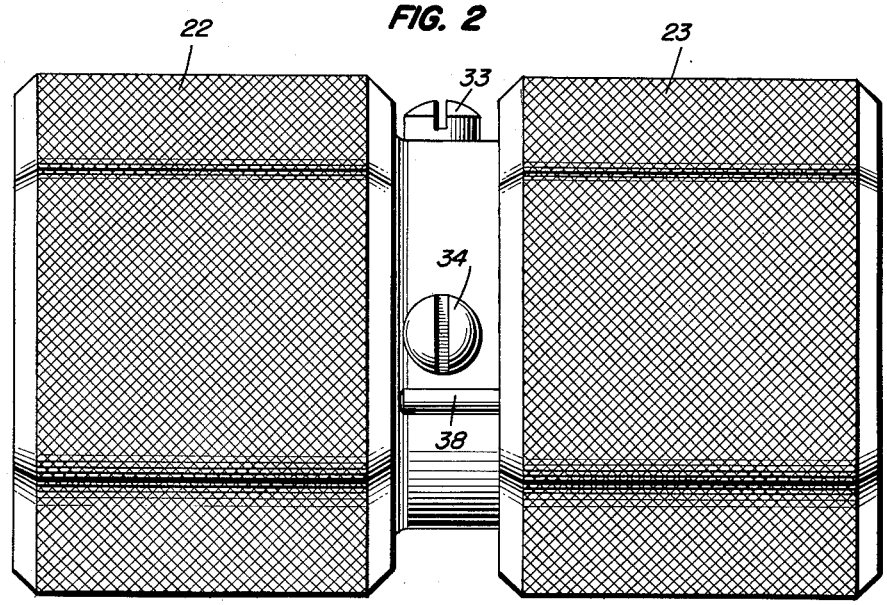
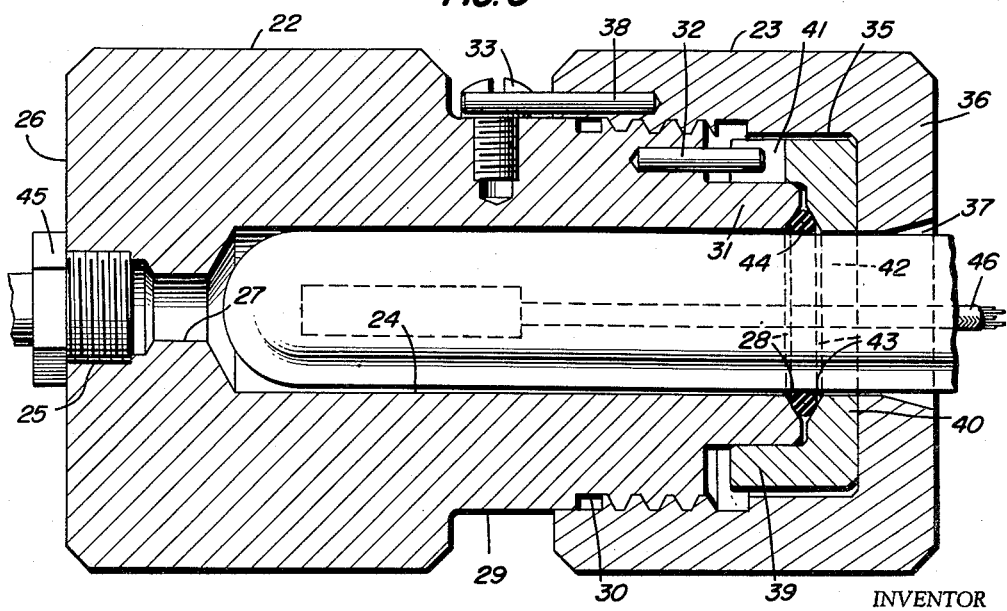

United States Patent Office 3,017,766
Patented Jan. 23, 1962

3,017,766
NOSE PROBE CHUCK
Vernon S. Foote, Jr., Marblehead, Mass., assignor to the United States of America as represented by the Secretary of the Navy
Filed Jan. 26, 1959, Ser. No. 789,217
3 Claims. (Cl. 73—40)

The present invention relates to missile testing apparatus and more particularly it relates to an improved chuck for use with testing apparatus for simulating various altitude conditions within a missile nose probe.

One object of the invention is to provide a chuck that will maintain a vacuum seal about a missile nose probe under test while permitting rotation of the probe to various desired attitudes.

Another object of the invention is to provide a chuck that will not damage the delicate surface of the nose probe stem or any ports therein.

As a further object, the invention provides a chuck which is characterized by ruggedness in construction and simplicity in operation.

Other objects and many of the attendant advantages of this invention will be readily appreciated as the same becomes better understood by reference to the following detailed description when considered in connection with the accompanying drawings wherein:

FIG. 2 is an enlarged side elevation of the improved chuck; and

FIG. 3 is an axial section of the chuck, the free end portion of a missile nose probe being shown sealed in position in the bore of said chuck.

Figure 1:
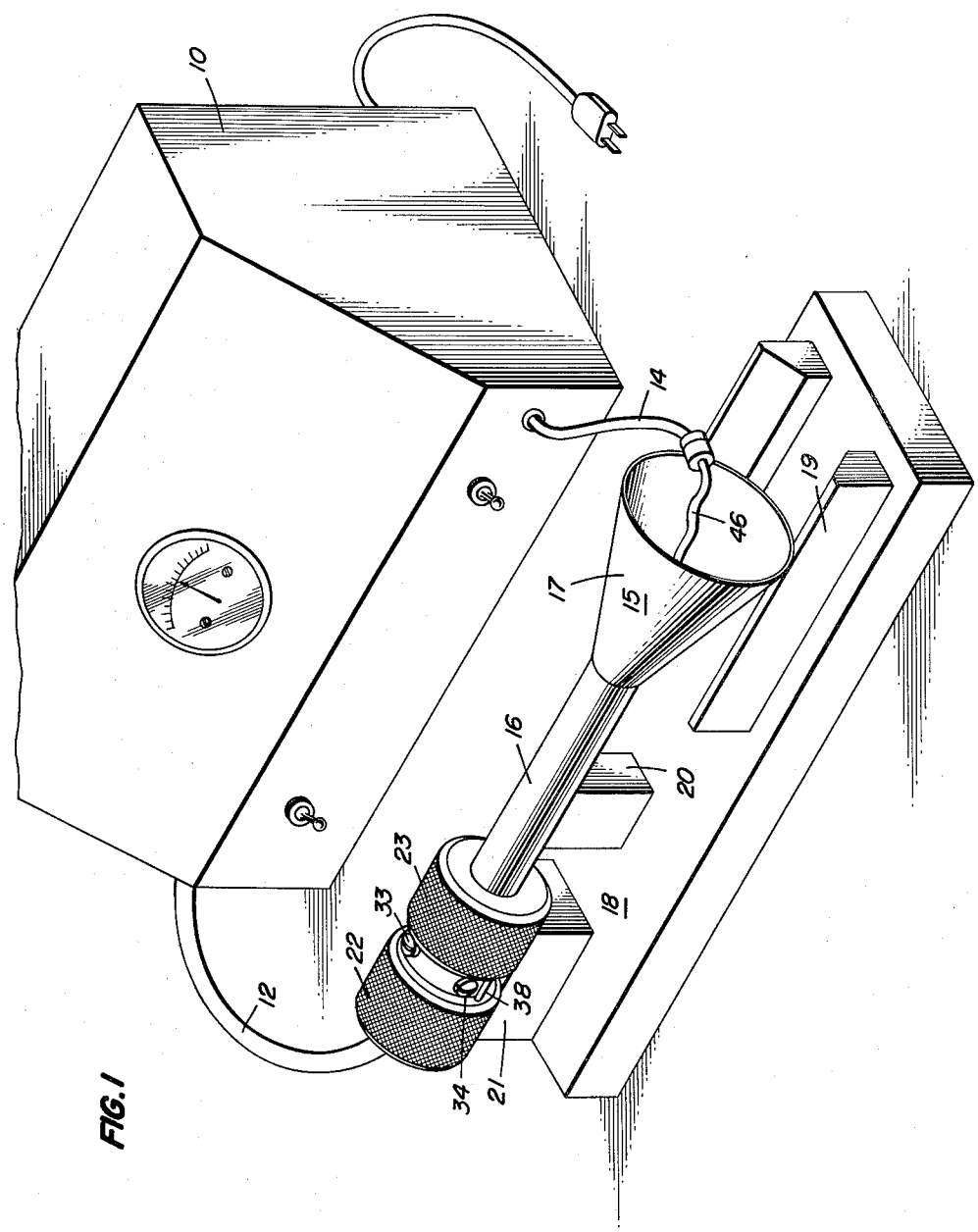
FIG. 1 is a perspective view showing a nose probe under test, and utilizing the improved chuck constituting the present invention.

The purpose of a missile nose probe tester is to detect material faults in a probe prior to installation thereof on a missile, to the end that any such faults may be corrected or another probe substituted, as may be appropriate. Examples of material faults would include incomplete, broken or short-circuited electrical wiring or connections, or air leaks or stoppages. The nose probe is tested by applying a known absolute pressure (i.e. vacuum) to the probe while at the same time observing the effect of such pressure on its electrical components, as shown on an indicating meter.

Referring to the drawings and first to FIG. 1 thereof, a test unit is shown generally at 10. The test unit 10 includes a vacuum pump (not shown) and electrical components (not shown) for performing testing operations, the vacuum pump being provided with a flexible pipe or line 12 and the electrical components with a cable 14. A typical nose probe to be tested is shown at 15 and includes a probe element 16 and a conical base member 17. The nose probe 15 is supported on a test jig or base 18 which may be of wood, metal or other suitable material, and consists of a cradle 19, a support block 20, and a chuck support 21.

The nose probe chuck constituting the present invention is shown in detail in FIGS. 2 and 3 and comprises a body 22 and a cap 23. The body is cylindrical in shape and a portion of its outer surface is knurled for easy manual engagement. The body 22 is formed with a central bore 24 which communicates with a threaded socket 25 in the outer end wall 26 of said body through a port 27. The bore is of sufficient diameter snugly to receive the end portion of the probe element 16, and is chamfered at 28. The outer surface of the body is reduced medially of its length to define an unthreaded portion 29 and a threaded portion 30, the latter to receive the cap 23. At its inner end the body is provided with a relatively thin, smooth surfaced sleeve portion 31, and projecting from the end of the threaded portion 30 longitudinally of the body above the sleeve portion is a key 32, the purpose for which will be explained hereinafter.

Screwed into the unthreaded portion 29 of the body are stops 33 and 34 which may conveniently take the form of fillister head screws. The stops 33 and 34 are mounted radially and are spaced 90 degrees, as shown in FIG. 2.

The cap 23 is of the same outside diameter as the body 22 and has a knurled outer surface and a central recess 35 and an end wall 36 formed with a flared opening 37 which is in alignment with the central bore 24. Extending from the rim of the cap 23 is a stop pin 38 which lies on an axis parallel to the axis of the body and projects above the unthreaded portion 29. The stop pin is positioned for engagement with the stops 33 and 34 and limits rotation of the cap 23 to substantially 270 degrees.

Positioned in the recess 35 of the cap 23 for limited axial sliding movement on the sleeve portion 31 is a collar 39 having an end wall 40 and a key slot 41, the latter to slidably receive the key 32 therein for preventing rotation of the collar in the recess but allowing longitudinal movement of said collar in said recess. The end wall 40 is formed with an axial opening 42 which is of the same diameter as the bore 24 and the inner end of the flared opening 37, and is in alignment therewith. The inner surface of the end wall 40 adjacent the opening 42 is chamfered, as shown at 43. Positioned between the chamfered surfaces 28 and 43 is an O ring 44 of rubber or other suitable resilient material.

In use, the chuck is placed on the chuck support 21 and the cap 23 is rotated counterclockwise until the stop pin 38 contacts the stop 33. In this position the collar 39 will be loose and the O ring uncompressed or expanded so as not to engage and seal the probe within the bore 24. The nose probe, which is positioned on the test jig or base 18, may then be shifted for causing the free end portion of the element 16 thereof to enter the chamber defined by the central bore 24. The cradle 19 and the support block 20 assure that the nose probe element will be guided smoothly into position in said bore. The cap 23 is then rotated clockwise until the stop pin 38 contacts the stop 34, i.e., through 270 degrees. Such rotation of the cap will shift the collar 39 inwardly for compressing or contracting the O ring 44 between the chamfered surfaces 28 and 43, and cause said ring to engage about the neck of the inserted end portion of the probe element 16 for effectively sealing said portion within the central bore. The flexible pipe or line 12 is connected to the chuck by a suitable plug 45 (FIG. 3), and electrical connections are made between conductors 46, leading from the interior of the probe element, and the cable 14. The testing operation may then be carried out for determining the behavior of the nose probe under various simulated conditions. After the tests have been completed, the cap 23 may again be rotated in a counterclockwise direction for releasing pressure on the O ring 44, when the end portion of the probe element may be removed from the chuck.

It is desired to emphasize that since the only connection between the chuck assembly and the nose probe is through the O ring 44, the nose probe may be rotated in the chuck without damage to the surface of the probe element. It is also desired to point out that the inside diameter of the O ring 44, in uncompressed condition, is greater than the diameters of the bore 24 and axial opening 42, so that said O ring will clear the surface of the probe during movement thereof into said bore. The danger of obstruction of the parts in the probe by scrapings from the O ring is thus eliminated.

Obviously many modifications and variations of the

What is claimed is:

1. In combination with a nose probe, an apparatus for testing the probe under simulated conditions, a chuck including a body provided with a centrally disposed bore, said bore defining a chamber for receiving the end portion of the probe, a cap in threaded engagement with said body and rotatable with respect thereto, said cap having an internal recess formed therein, a sleeve integrally formed on one end of the body and disposed within said recess, a collar disposed within said recess and movably mounted on said sleeve, an end wall on the cap in engagement with said collar for moving the collar upon rotation of the cap on the body, means carried by the body in engagement with the collar for causing the collar to move slidably along said sleeve as the cap is rotated, a chamfered surface on the terminal end of the sleeve, a complementary chamfered surface on said collar, and a normally expanded O-ring disposed between said chamfered surface on the sleeve and the complementary chamfered surface on the collar and movable into sealing engagement with the chamfered surfaces on the sleeve and the collar and with the probe as the collar is moved along the sleeve by said end wall on the cap.

2. A nose probe chuck including a body provided with a centrally disposed bore formed therein and defining a chamber for receiving the probe, a cap in threaded engagement with said body for movement along the body upon rotation of said cap on the body, said cap having a centrally disposed recess formed therein, a sleeve integrally formed on one end of the body and disposed within the recess in said cap, a collar member disposed within said recess in engagement with said cap and movably mounted on said sleeve, a flange on said collar member and surrounding the terminal end of the sleeve for movably mounting the collar member on the sleeve, a key slot formed in said flange, a pin carried by said body and disposed within said key slot for causing the collar member to move slidably along said sleeve upon rotation and movement of the cap on the body, a chamfered surface on the terminal end of the sleeve, a complementary chamfered surface on the collar member, and a normally expanded O-ring disposed between said chamfered surfaces on the sleeve and the collar and contractible an amount sufficient to sealably engage said chamfered surfaces and the probe as the collar is moved along the sleeve by the cap upon rotation and movement of the cap on the body.

3. A nose probe chuck including a body, a cap threaded on said body and movable along the body upon rotation thereof, a pair of mutually spaced stops on the body, a stop pin on the cap and movable between said stops upon rotation of the cap for limiting the rotation of the cap in accordance with the direction of rotation thereof, said body having a centrally disposed bore and said cap having an internally disposed recess, said bore defining a chamber for receiving the probe, a sleeve on one end of the body and disposed within said recess in the cap, a member mounted on said sleeve and disposed within the recess and movable slidably on the sleeve upon rotation of the cap, a flange formed on the member for mounting the member on the sleeve, means carried by the body in engagement with said flange for causing the member to move slidably on the sleeve upon rotation of the cap, a chamfered surface on one end of said sleeve, a complementary chamfered surface on the collar, and a normally expanded O-ring disposed between the chamfered surfaces and movable into sealing engagement therewith and with the probe as the member is slidably moved on the sleeve by said cap a predetermined amount.

References Cited in the file of this patent

UNITED STATES PATENTS

| 1,077,710 | Hesse | Nov. 4, 1913 |
| 1,286,819 | Snyder | Dec. 3, 1918 |
| 2,107,922 | Westin | Feb. 8, 1938 |
| 2,608,854 | Gambrill | Sept. 2, 1952 |
| 2,706,398 | Davidson | Apr. 19, 1955 |
| 2,791,451 | Rostan | May 7, 1957 |
| 2,965,308 | Holdren | Dec. 20, 1960 |